June 7, 1938.    R. HOLZCKER    2,119,914
APPARATUS FOR THE SKIN TREATMENT OF CITRUS FRUIT
Filed Jan. 20, 1936
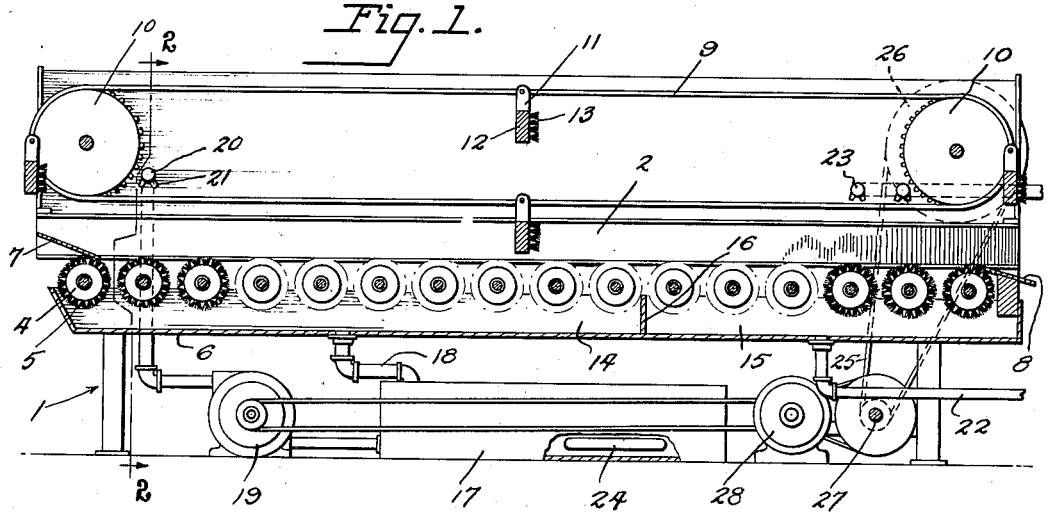
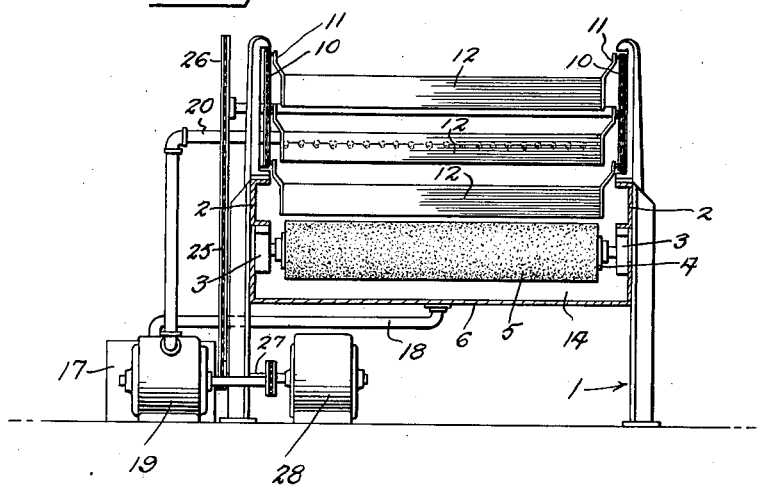
Inventor
Richard Holzcker
By Mason Fenwick & Lawrence
Attorneys Patented June 7, 1938

2,119,914

UNITED STATES PATENT OFFICE 2,119,914

APPARATUS FOR THE SKIN TREATMENT OF CITRUS FRUIT

Richard Holzcker, Lake Wales, Fla., assignor to Citrus Color & Supply Company, Tampa, Fla., a corporation of Florida Application January 20, 1936, Serial No. 59,964

2 Claims. (Cl. 91—25)

This invention relates to the treatment of fresh citrus fruits whereby the appearance, color, keeping qualities and general saleability are enhanced.

The invention has for its object the provision of apparatus for applying to the surface of the fruit a suitable substance or compound preferably in liquid form for imparting the above qualities to the fruit, thoroughly distributing the substance over the surface of the fruit, removing the excess, washing, and drying, polishing or otherwise finishing the surface of the fruit.

Another object of the invention is to provide apparatus including a recurrent liquid circulation system having spray nozzles for applying the liquid to the fruit, a reservoir containing a supply of the liquid and so placed as to receive the excess liquid draining from the fruit, a pump for lifting the liquid from the reservoir to the spray nozzles and including a gap in the system between the spray nozzles and reservoir with a conveyor entering said gap for bringing the citrus fruit into the path of the jets from the spray nozzles.

Another object of the invention is to provide a bed of rotating brushes on to which the citrus fruit are fed and which keeps them in relative rotation against one another and in wiping relation to the brushes, and other brushes engageable with the surface of the fruit and functioning as a conveyor to move the fruit from the region of the spray nozzles to the region of the washing instrumentalities.

Other objects of the invention will appear as the following description of a preferred and practical embodiment thereof proceeds.

In the drawing throughout the figures of which the same characters of reference have been employed to designate identical parts:

Figure 1 is a side view in vertical section and

Figure 2 is a section taken along the line 2—2 of Figure 1.

Before referring in detail to the construction of the apparatus, it may be stated that diversified processes are commonly practiced for treating the surfaces of citrus fruits with various substances and for different purposes. For example, the fruit may be immersed in a boracic acid solution to immunize it against infection by blue-mold or it may be subjected to a coating of paraffine to enhance the gloss as well as to retard drying out of the fruit.

It is known also to immerse the fruit in a heated emulsion of a coloring principle in a vehicle of solvent which also has the capacity of dissolving out some of the natural oil of the fruit skin replacing it by the coloring matter which thus impregnates rather than coats the skin and may be used to impart a uniform or natural varietal color to off-color fruit.

Each of these processes requires especial apparatus for its efficient employment and while the apparatus of the present invention is adapted either with or without modifications to the practice of any of the processes commonly applied to the surfaces of citrus fruit it is particularly intended for the practice of a process which involves a combination of the waxing process with the coloring process. In other words, the apparatus of the present invention is especially applicable to a process which combines the coloring as well as the waxing of the fruit in a single operation in which the interstices or pores in the skin laid bare by the solvent which carries the coloring matter are in part filled by the wax, a particularly strong bond between the wax and fruit skin being thus formed and the wax filling the pores and retarding the shrinking of the fruit due to evaporation of its juices.

Referring now in detail to the drawing, the numeral 1 representing in general a frame having side members 2 upon which are mounted bearings 3, carrying a series of parallel cylindrical brushes 4. The brushes are preferably arranged in a horizontal plane, although it is within the purview of the invention to have them slightly inclined if desired from the inlet toward the exit end of the apparatus. The brushes are furnished with a bristled periphery 5 and are arranged so as to slightly clear one another, leaving a narrow space through which foreign particles may fall into an underlying trough 6. There is an incline 7 down which the fruit roll on to the anterior part of the bed of brushes 4 and there may be a downwardly inclined chute 8 at the opposite end facilitating the discharge of the fruit. The brushes rotate by means of suitable gearing, not shown, in unison in the same direction, that is to say, with their upper peripheral portions moving toward the discharge end. This motion assists in propelling the citrus fruits from the inlet to the discharge end of the apparatus, but the fruit linger in the troughs formed between the brushes, being subjected to a wiping action of the bristles. This wiping action is imparted to the entire surface of the fruit which turns under the frictional pressure of the bristles constantly presenting new surfaces to the bristles.

After the fruit have filled a few of the riffles or troughs between the brushes, the aggregate frictional pressure of the fruit against the brushes overcomes the propulsive component of the torque of the brushes so that additional means is required for pushing the fruit to the discharge end of the apparatus.

This has the form of a chain belt 9 or other type of conveyor passing over sprockets 10 arranged at the opposite sides of the apparatus above the bed of brushes and suitably driven as by a belt 25 passing over pulleys 26 and 27, the latter being driven from an electric motor 28 which also operates the pump 19. The chain belt at intervals is provided with depending lugs 11 suspending transverse brushes 12 having bristled faces 13 on one side, the bristles being oriented in the same direction, toward the discharge end of the apparatus and the conveyor moving in the direction of said discharge end so that the bristled sides of the brushes engage the fruit and roll it over the undulations of the brushes constituting the bed. It is obvious that since the transverse brushes 12 have a translatory movement with respect to the bed of rotary brushes, the surface of the fruit is subjected to a variety of types of wiping action through which the material impinged upon the fruit skins is thoroughly worked into the pores of the skins, the excess removed and a fine polish imparted to the fruit.

The trough 6 is divided into two chambers 14 and 15 by a partition 16. The anterior chamber drains into a reservoir 17 by means of a pipe 18 and a pump 19 picks up the liquid from the reservoir and supplies it to a transverse pipe 20 having a plurality of spray nozzles 21 directed toward the fruit at the anterior end of the bed of brushes. The treating liquid which may be a germicide, a solution of paraffine, a color-carrying solvent or any suitable treating emulsion or a combination of such liquids or substances is sprayed upon the fruit at the anterior end of the brush bed and thoroughly worked into and upon the surface of the fruit by the wiping action of the rotary as well as the transversely moving brushes, the fruit being carried progressively toward the discharge end of the conveyor.

The chamber 15 of the trough 6 drains through a pipe 22 to any suitable depository and catches liquid supplied by the spray nozzles 23. Ordinarily, the liquid sprayed is water and is for the purpose of removing any vestige of soluble matter that may remain on the fruit skin as they pass above the chamber 15 and beneath the nozzles 23. As a matter of fact, it is contemplated, if desired, that the spray nozzles 23 shall blow air upon the fruit for drying purposes in which case, of course, the chamber 15 is for the time, functionless.

In carrying out the invention, it is preferred to provide in the reservoir 17 a body of liquid consisting of an aqueous emulsion of a suitable coloring matter such as yellow AB, yellow OB, alkanet red in a suitable solvent such as diethylene glycol monoethyl ether in which a proportion of wax, such as paraffine, carnauba, etc., is also dissolved, the emulsion being preferably at ordinary room temperature or in any event not heated above 120° F. A heater 24 beneath the reservoir 17 permits the emulsion to be warmed when desirable. This emulsion is sprayed upon the fruit at the anterior end of the brush bed and the effect of the solvent is to dissolve some of the natural oil of the fruit skin which is replaced by the emulsion, the coloring matter and particularly the wax entering and filling the pores and forming a tenacious bond for the wax film which coats the surface of the fruit. The action of the bristles of the brushes is to remove all excess emulsion from the fruit to compact the wax coating firmly against the fruit skin and into the interstices, the continued action of the brushes being to impart a polish to the fruit. At the tail of the process, the fruit is subjected to the action of the water or air spray and the finished fruit is discharged from the apparatus by way of the chute 8.

While I have in the above description disclosed what I believe to be a preferred and practical apparatus for carrying out the process of treating citrus fruits, it will be understood to those skilled in the art that the details of construction and arrangement as illustrated and described are merely by way of example and not to be construed as limiting the scope of the invention as claimed.

What I claim is:

1. Apparatus for treating the surface of citrus fruits comprising a bed of juxtaposed brushes mounted to rotate on substantialy parallel axes and having cylindrical bristled faces, a conveyor above said brush bed moving in the direction substantially perpendicular to the axes of said rotatably mounted brushes, said conveyor comprising a series of brushes moving over said brush bed from the anterior to the posterior end thereof in a path to engage citrus fruit and roll them toward the discharge end of the apparatus, means over the anterior end of said brush bed for applying liquid to the surface of the fruit, the riffles formed between adjacent of the rotatably mounted brushes detaining the fruit whereby its surface is subjected to the wiping action of the bristles of said brushes, a tank below the anterior end of said bed for catching surplus liquid from said applying means and a pump for returning liquid from said tank to said applying means during dye spraying.

2. Apparatus for treating the surface of citrus fruits comprising a bed of juxtaposed brushes mounted to rotate on parallel axes having cylindrical bristled faces, a conveyor above said brush bed moving in a direction substantially perpendicular to the axes of said rotatably mounted brushes, said conveyor comprising a series of wiping elements extending transversely of said brush bed having the dual function of wiping the surfaces of the fruit and of engaging said fruit to roll them toward the discharge end of said apparatus over said bed of brushes, means over the anterior end of said brush bed for spraying dye upon the surface of the fruit, the riffles formed between adjacent of the rotatably mounted brushes detaining the fruit whereby its surface is subjected to the wiping action of the bristles of said brushes during dye spraying, and means over the posterior end of said brush bed for spraying air or water upon the fruit and subjecting the fruit to the wiping action of the bristles during the water or air spraying.

RICHARD HOLZCKER.